United States Patent

Crane et al.

[11] Patent Number: 4,470,710
[45] Date of Patent: Sep. 11, 1984

[54] I. R. RADIATION PYROMETER

[75] Inventors: Kenneth Crane, New South Wales; Peter J. Beckwith, Strathmore, both of Australia

[73] Assignee: Commonwealth of Australia, Canberra, Australia

[21] Appl. No.: 396,541

[22] PCT Filed: Dec. 4, 1981

[86] PCT No.: PCT/AU81/00185
§ 371 Date: Jul. 8, 1982
§ 102(e) Date: Jul. 8, 1982

[87] PCT Pub. No.: WO82/02092
PCT Pub. Date: Jun. 24, 1982

[30] Foreign Application Priority Data
Dec. 11, 1980 [AU] Australia .............................. PE6899

[51] Int. Cl.³ .............................................. G01J 5/00
[52] U.S. Cl. ..................................... 374/127; 374/123
[58] Field of Search ................ 374/123, 124, 127, 128

[56] References Cited

U.S. PATENT DOCUMENTS

| 3,352,156 | 11/1967 | Beitz | 374/123 |
| 3,477,291 | 11/1969 | Osawa et al. | 374/127 |
| 3,501,237 | 3/1970 | Lide | 374/127 |
| 3,611,805 | 10/1971 | Hishikari | 374/127 |
| 3,641,345 | 2/1972 | Coackley et al. | 374/127 |
| 3,715,922 | 2/1973 | Menge | 374/127 |
| 3,806,249 | 4/1974 | Lesinski | 374/127 |
| 4,342,912 | 8/1982 | Adamson | 374/123 |

FOREIGN PATENT DOCUMENTS 53120481  10/1978  Japan .................................. 374/127

Primary Examiner—Charles Frankfort
Assistant Examiner—David R. Schuster
Attorney, Agent, or Firm—Pollock, Vande Sande & Priddy

[57] ABSTRACT

A two-wavelength I.R. pyrometer for monitoring the rapid heating of materials by C W lasers or electron beams. The I.R. radiated from the material is separated into two closely adjacent wavelengths and signal values representative of those wavelengths are obtained. These signal values are then processed through an electronic circuit where the signal value of one of the signals is held substantially constant by a feedback control while the other signal value is influenced by approximately the same feedback control applied to the first signal value and wherein the resultant signal values are then processed through a circuit determining a ratio of one signal value divided by the other. This is then a measure of the temperature of the material. Also disclosed is a chopper wheel for a two-wavelength I.R. pyrometer. The wheel has a plurality of circumferentially extending I.R. filters of alternating wavelengths ($\lambda_1$, $\lambda_2$).

6 Claims, 12 Drawing Figures

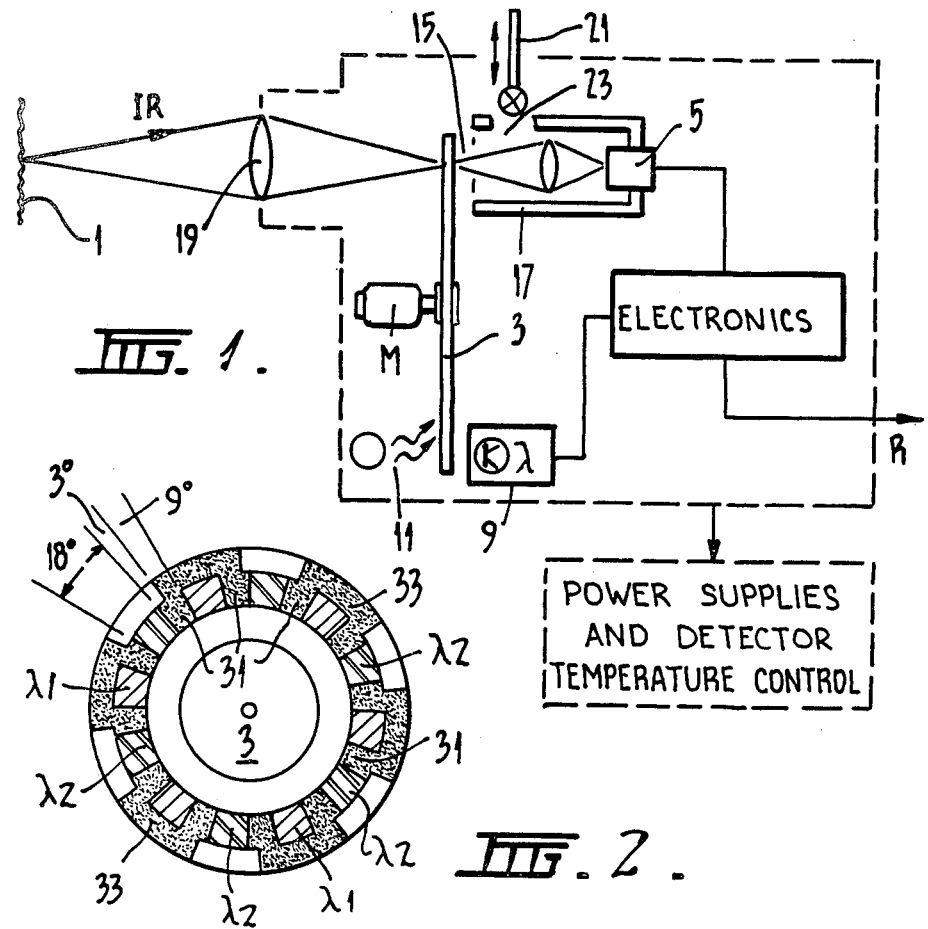
FIG. 1.
FIG. 2.
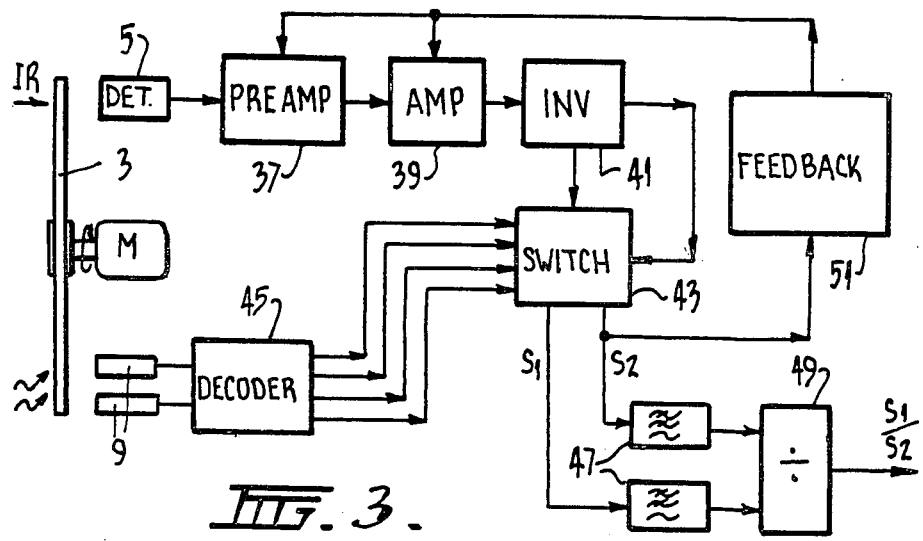
FIG. 3.

I. R. RADIATION PYROMETER

BACKGROUND OF THE INVENTION

This invention relates to an I.R. two wavelength radiation pyrometer and relates particularly but not exclusively to an I.R. radiation pyrometer which has a fast response time and a wide dynamic range. A particular embodiment of the invention has application in the measurement of the rapid temperature rises caused by the irradiation of a surface with a laser beam.

DESCRIPTION OF PRIOR ART

Hitherto in the art of the measurement of surface temperatures of bodies irradiated by lasers or by other energy sources such as electron beams, it has been a problem to provide an instrument which has a sufficiently fast response time to follow the temperature changes, as well as a sufficiently wide dynamic range to cover the temperatures envisaged—from in the order of 600° K. to 3000° K. in a time period of 100 ms. It is also a problem to measure this temperature rise over a small area, as for example in the order of 1 millimeter.

STATEMENT OF THE INVENTION

An embodiment of the present invention will operate to cover the aforementioned temperature ranges and in the required time period and will also detect this change over an area of approximately 1 mm.

The aforementioned characteristics of a desired pyrometer have been achieved by an embodiment which obtains a ratio between signals derived from the radiated I.R. from the body at two slightly different wavelengths.

One of the signal values is maintained approximately constant and the other signal value is influenced by substantially the same value of the control for maintaining the said one signal value approximately constant. The two signals values are then fed to a ratio providing means where preferably one of the signals values is divided into the other signal value whereby to obtain a signal value representative of the temperature.

The required area of view can be controlled by known optical means.

Therefore, according to a preferred aspect of the present invention, there is provided a pyrometer which uses an I.R. radiation two wavelength measurement technique, said pyrometer having means for measuring the I.R. radiated from a surface of a body at two I.R. wavelengths and for providing respective signal values derived therefrom, electronic circuit means for maintaining the value of one of the signals approximately constant by a feedback control which monitors one of said signals to ascertain a required feedback control, said circuit means also influencing the value of the other signal by substantially the same feedback control and a means for determining a ratio between the two signals whereby to represent the temperature of the surface of the body.

It is particularly preferred that the means for measuring I.R. radiated from the surface of a body at the two wavelengths be a single detector.

Most preferably, the I.R. radiated from the surface of the body is directed onto a chopper wheel which comprises a series of optical filters which successively are for one wavelength of the I.R. radiated and for the other wavelength of I.R. radiated, and wherein a signal circuit is activated as each of the respective filters on the chopper wheel is placed in the path of the I.R. beam, whereby to activate circuitry to pass the I.R. signals from one wavelength to one filter circuit and the I.R. signals of the other wavelength to another filter circuit, prior to being further processed by said ratio determining means.

A chopper wheel is also included within the scope of the invention, and in its broadest aspect it may comprise a chopper wheel body with a plurality of circumferentially extending filters therein, said filters alternating sequentially for one wavelength of I.R. and for another wavelength of I.R., said filters being formed by a vacuum deposition.

BRIEF DESCRIPTION OF DRAWINGS

In order that the invention may be more clearly understood, several embodiments will now be described with reference to the accompanying drawings wherein:

FIG. 1 is a basic schematic diagram of the preferred pyrometer.

FIG. 2 is a view of the face of a chopper wheel used in the preferred embodiment.

FIG. 3 is an electrical schematic block circuit diagram of the pyrometer of FIG. 1.

INITIAL CONSIDERATIONS

A: Limitations of Single-Wavelength Pyrometry

Figure 4:
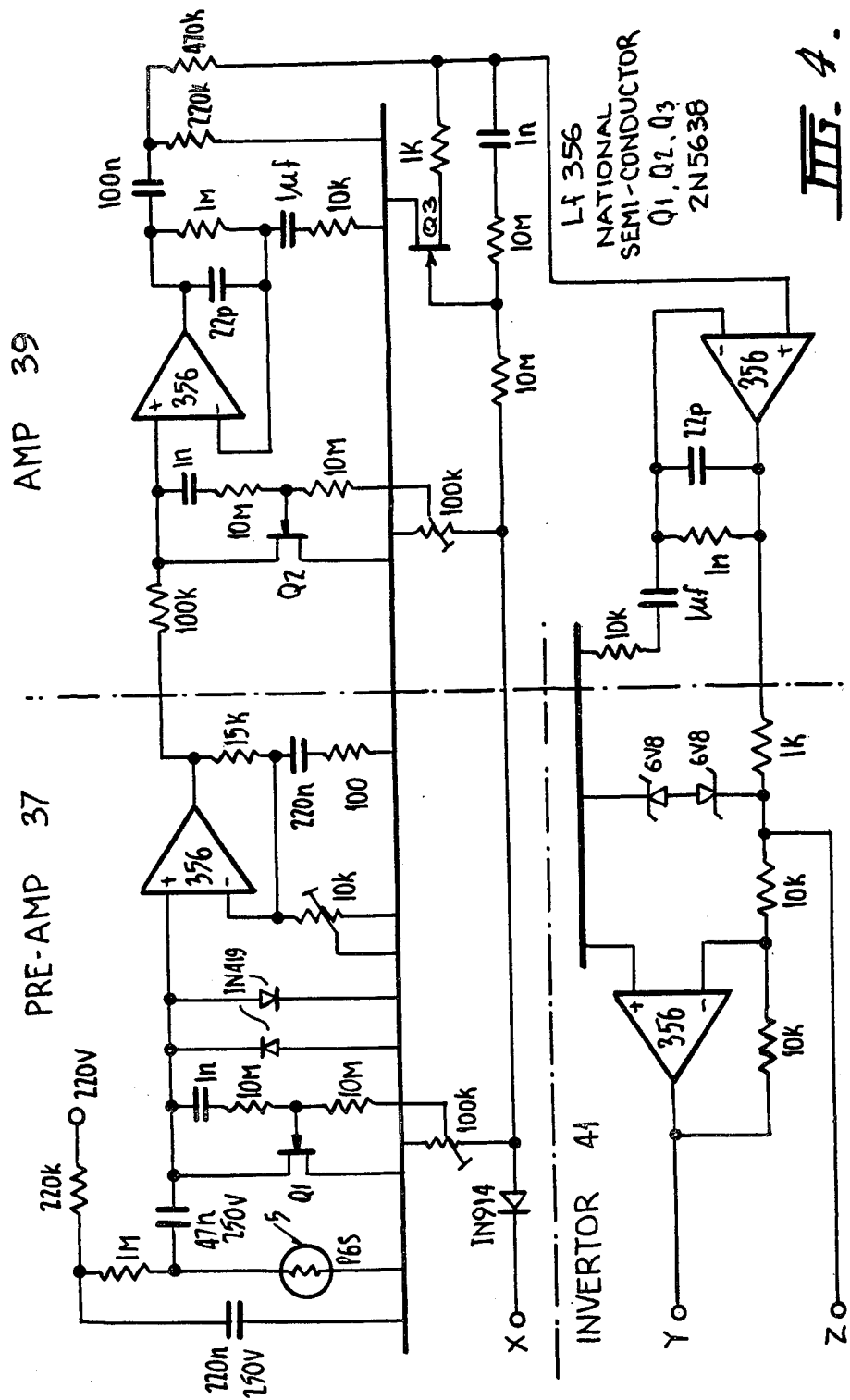
FIG. 4 is a detailed circuit diagram of part of the circuit in FIG. 3.

The dependence of the single-wavelength pyrometer signal S on spectral emissivity $\epsilon$ and absolute temperature T is, from Wein's approximation, $$S = A'C_1\lambda^{-5}\epsilon \exp[-C_2/(\lambda T)] \qquad (1)$$

where $A'$ is an instrument constant, $C_1 = 3.74 \times 10^{-16}$ W m$^2$, $\lambda$ is the wavelength, and $C_2 = 1.44 \times 10^{-2}$ m K. For the most demanding condition considered here, namely $\epsilon = 0.05$ and T = 600 K., the sensitivity of available radiation detectors limits $\lambda$ to approximately 2 $\mu$m or greater. The lower limit of 2 $\mu$m is preferable since Eq. (1) shows that S(T) is then least sensitive to uncertainties in $\epsilon$.

Testing on single wavelength I.R. pyrometers shows that the uncertainity of T at T = 1200° K., is ±320° K. for aluminum. Thus, the accuracy at this temperature measurement is poor, and at higher temperatures the uncertainty becomes greater. Operation at shorter wavelengths alleviates the problem at the higher temperatures, but the ability to measure low or even intermediate temperatures is then sacrificed. In the more common non-steady-state experiments, such as when a metal plate is heated from ambient temperature to a temperature above melting, rapid oxidation and melting effects may, through changes in $\epsilon$, completely defeat attempts to interpret the signal-time trace, and instantaneous uncertainties in T may at times be large.

B: Two-Wavelength Pyrometry

Consider now a two-wavelength pyrometer operating at $\lambda_1 = 2.0$ μm and $\lambda_2 = 2.5$ μm. From Eq. (1), the ratio signal R is given by:

$$R = S_1/S_2 = B(\frac{\epsilon_1}{\epsilon_2}) \exp(-T_1/T) \quad (2)$$

where $T_1 = 1439$ K and B is an instrument constant. The wavelength separation is sufficient to assure that R is sensitive to T for T < 3000 K, but small enough to imply a small uncertainty in $E_1/E_2$.

Tests on a prototype two wavelength I.R. pyrometer in accordance with the present invention show that it affords greater accuracy than the single-wavelength device.

In addition to affording improved absolute accuracy, the two-wavelength pyrometer provides relative temperature measurements that are likely to be more accurate than those from a single-wavelength device. This is because, in most cases, $E_1/E_2$ for given material varies only slightly during a heating period even though its absolute value may not be accurately known.

DESCRIPTION OF PREFERRED EMBODIMENT

Referring now to FIG. 1, I.R. radiation from the sample 1 is chopped by optical bandpass filters on a chopper wheel 3 driven by a motor M. The respective filters are centered in turn on 2.0 μm, and 2.5 μm and directed on a single detector 5. The outputs of the detector 5 are electronically processed to provide the required temperature signal value. Further detector element means 9 and an associated light source 11 are positioned across the chopper wheel 3 so as to obtain switch signals which selectively pass the respective filter signals values through the electronics when the I.R. passes through the respective filters and is detected by the detector 5.

The detector 5 is a PbS photoconductive cell with an inbuilt thermoelectric refrigerator (Opto Electronics Inc OTC-22-53). The viewed area of the detector 5 is defined by a small aperture 15 near the front of the detector 5 housing 17 and by the lens 19. In order to identify the area on the sample a removable lamp 21 is placed behind the aperture 15 through an opening 23 in the housing 17. Thus the light passing through the opening 15 and the lens 19 appears on the sample 1.

Referring now to FIG. 2, there is shown a preferred chopper wheel 3 made of crown glass and having optical filters $\lambda_1$ and $\lambda_2$ vacuum deposited thereon. These filters are arranged in an alternating sequence on $\lambda_1$ (2.0 μm) and $\lambda_2$ (2.5 μm) and have a six-fold symmetry. All filters have a width at half maximum height of 0.12 μm. Opaque areas 31 separate the respective filters $\lambda_1$, $\lambda_2$. Around the periphery of the filters $\lambda_1$ and $\lambda_2$ are further opaque areas 33. The opaque areas 31 and 33 are used to provide code signals as to which of the filters $\lambda_1$ or $\lambda_2$ is in front of the detector 5. A small D.C. motor M spins the chopper wheel 3 at 5300 rpm, thus giving a $\lambda_1:\lambda_2$ comparison cycle time of 1.9 ms.

The filters $\lambda_1$ and $\lambda_2$ and the opaque areas 31 and 33 are deposited by a known, direct vacuum deposition technique through suitable mask means.

Referring now to FIG. 3, the signal output from the detector 5 is passed to a preamplifier 37, then through an amplifier 39 and then through an inverter 41. The signal output from the inverter 41 is then passed to a phase sensitive detector switch 43. This switch 43 is controlled to pass $S_1$ or $S_2$ signals corresponding to the I.R. passed through the filters $\lambda_1$ and $\lambda_2$ respectively at the instants that those filters $\lambda_1$ or $\lambda_2$ are opposite the detector 5. This switching is controlled by a pair of detector elements 9 which have outputs decoded by a decoder 45. The respective signal values $S_1$ and $S_2$ pass through respective low pass filters 47 and then to a ratio determining means 49 which divides $S_1$ by $S_2$. A feedback control 51 whereby to sensitive to the $S_2$ signal maintains the value of $S_2$ approximately constant throughout the measuring.

FIG. 4 shows the detailed circuit diagrams of the detector 5, the preamp 37, the amplifier 39 and the inverter 41.

The preamplifier 37 has a rising frequency characteristic above about 150 Hz to compensate for the falling response of the detector 5 and to increase the stability margin of the feedback 51. It is mounted close to the detector 5 to reduce stray capacitance and to minimize RF pickup. Both the preamplifier 37 and subsequent gain stages of the amplifier have electronically variable input attenuators utilizing 2N5638 FETs in a shunt mode; these attenuators allow very hot sources to be measured without amplifier 39 overload.

Figure 5:
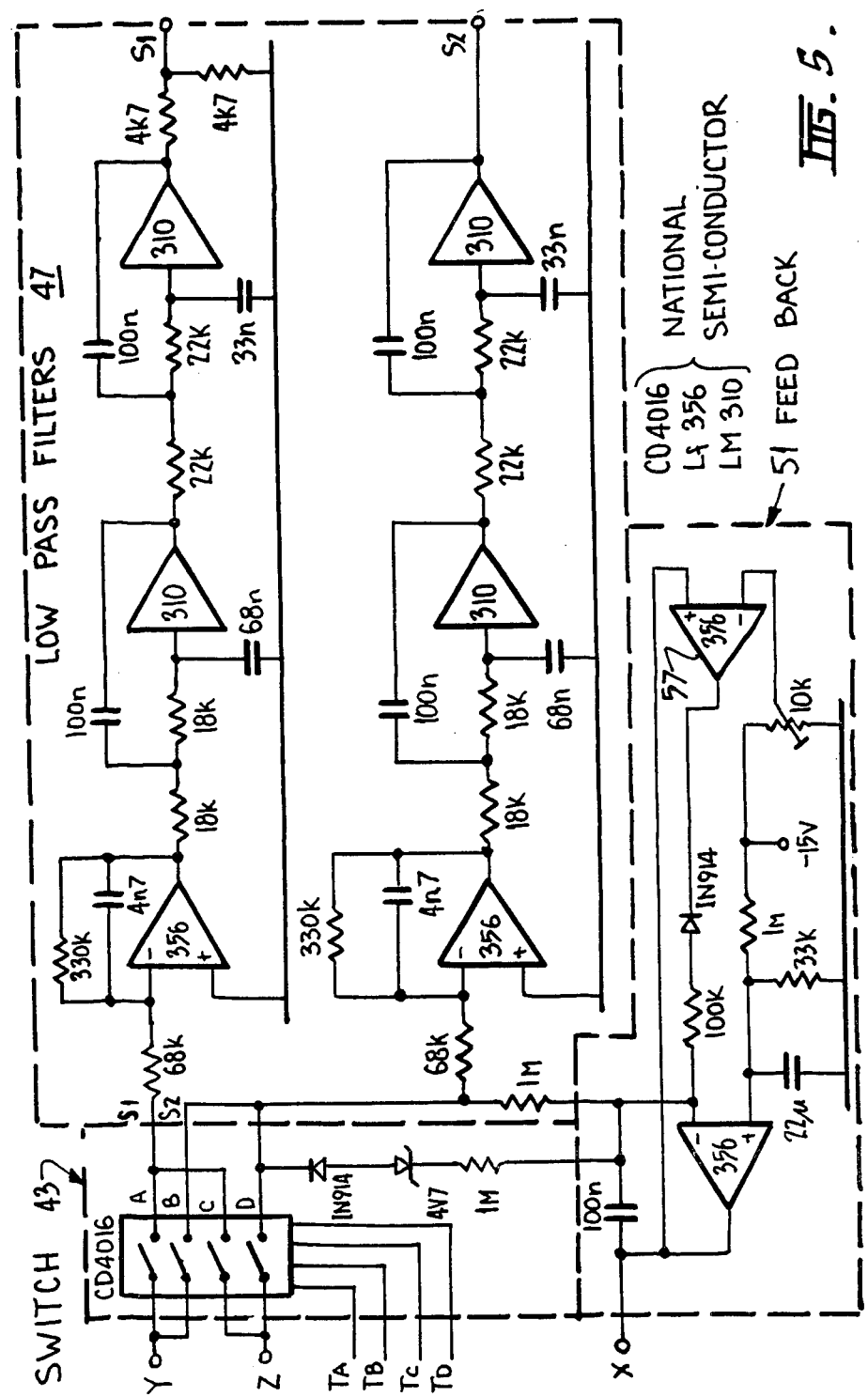
FIG. 5 is a detailed circuit diagram of another part of the circuit shown in FIG. 3.

FIG. 5 shows the detailed circuit diagrams of the switch 43, the low pass filters 47 and the feedback 51.

An active clamp 57 in the feedback 51 is used in order to reduce the time needed to cause the system to settle if the source intensity should unexpectedly rise from a low value.

The outputs of the phase sensitive detector switch 43 are electrically smoothed by identical low-pas switch filters 47, each having a fifth-order Bessel characteristic with a zero-frequency group delay of 5.4 ms.

Figure 6:
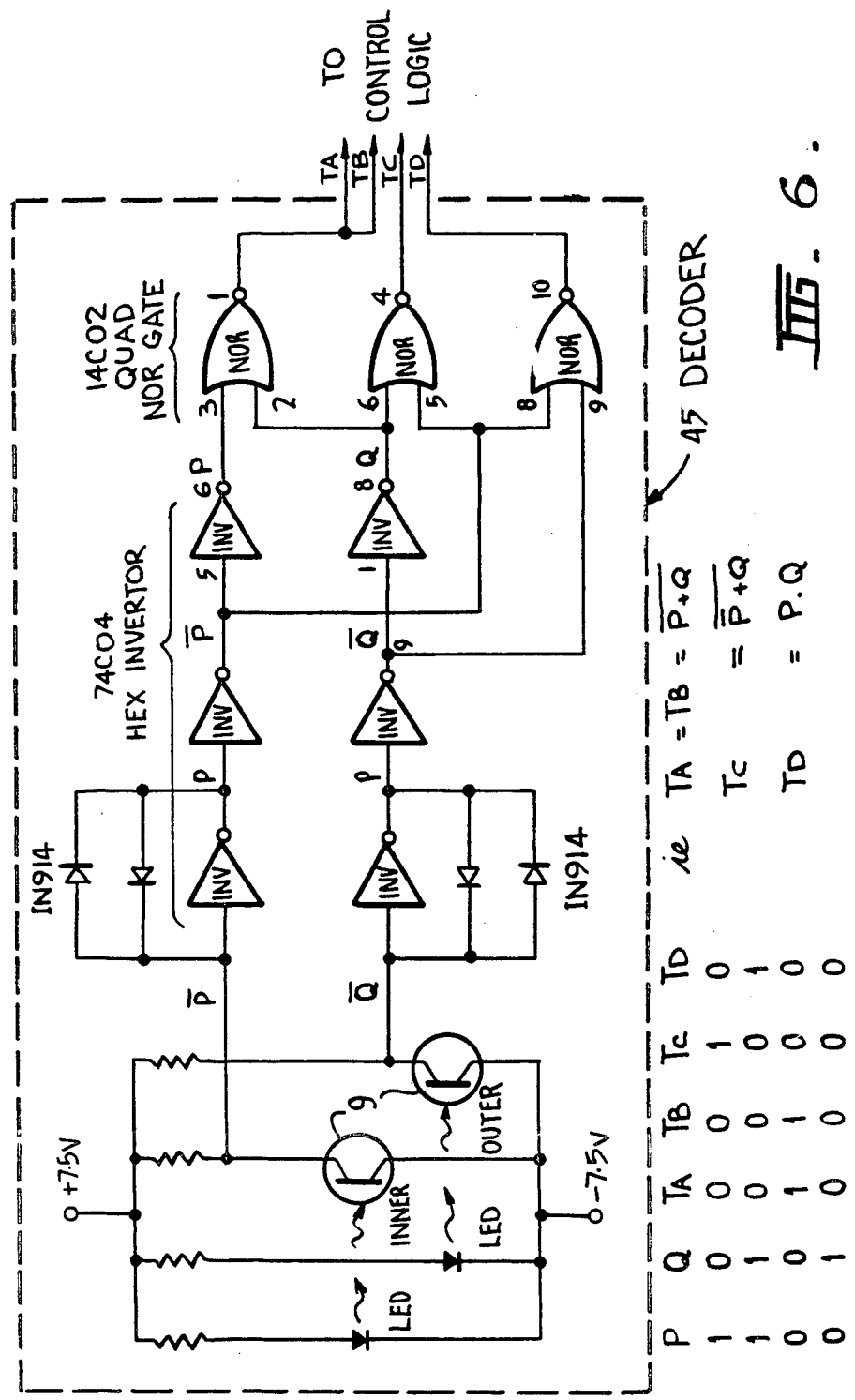
FIG. 6 is a detailed circuit diagram of a further part of the circuit shown in FIG. 3.

FIG. 6 shows a detailed circuit diagram of the detectors 9 and the decoder 45. The decoder uses 74C04 Hex Invertors and 74C02 Quad NOR gates and provides 4 logic output lines TA, TB, TC & TD which pass to the switch 43.

Figure 7:
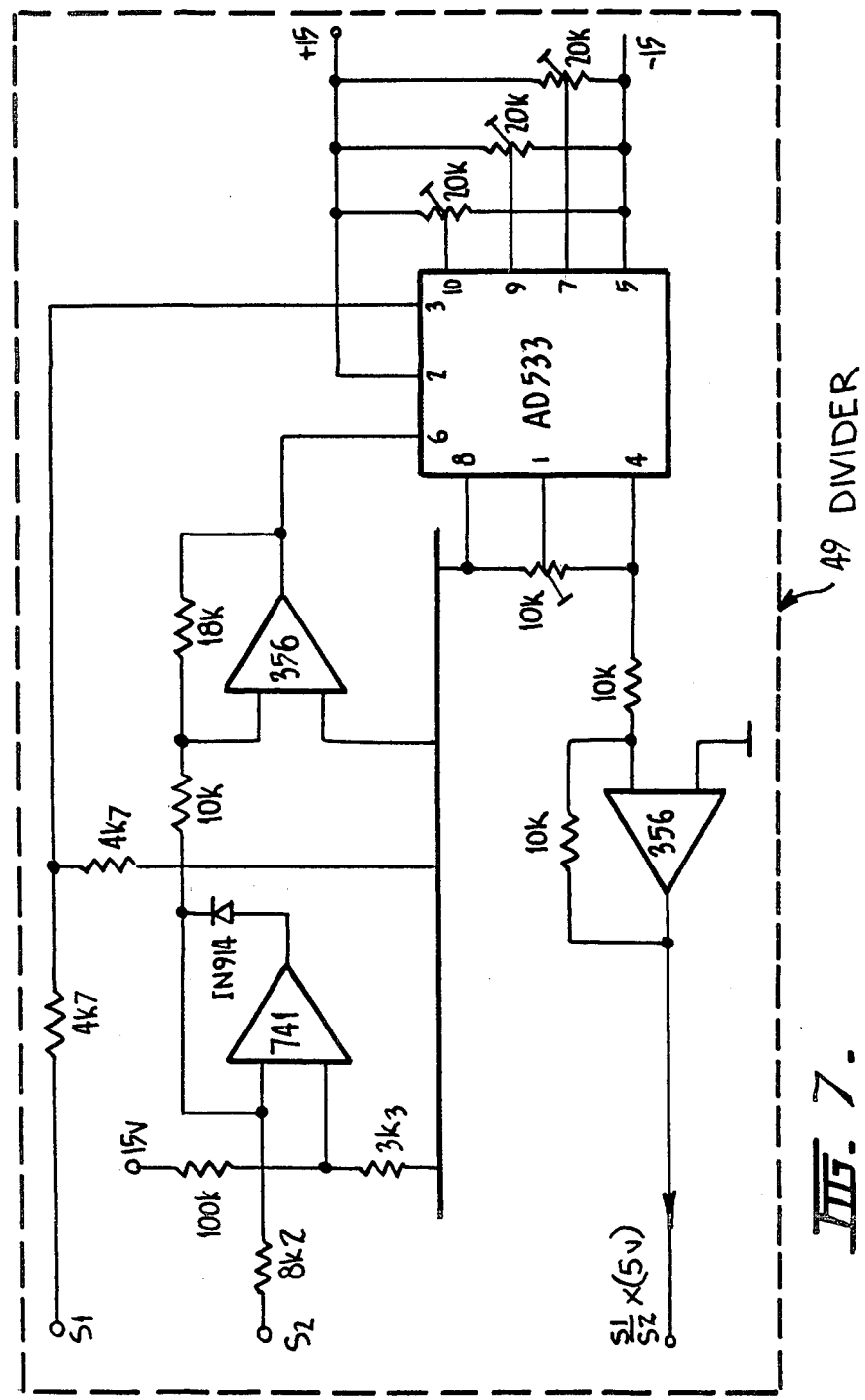
FIG. 7 is a detailed circuit diagram of an even further part of the circuit shown in FIG. 3.

FIG. 7 shows the detailed circuit diagram of the divider 49. The ratio of the two signals $S_1$, $S_2$ corresponding to the two wavelengths $\lambda_1$ $\lambda_2$ is determined by a standard analog divider based on an AD533 computational circuit—see Analog Devices Data Acquisition Products Catalogue (Analog Devices Inc. Norwood Mass. 1978) pp 175–177.

Figure 8A:
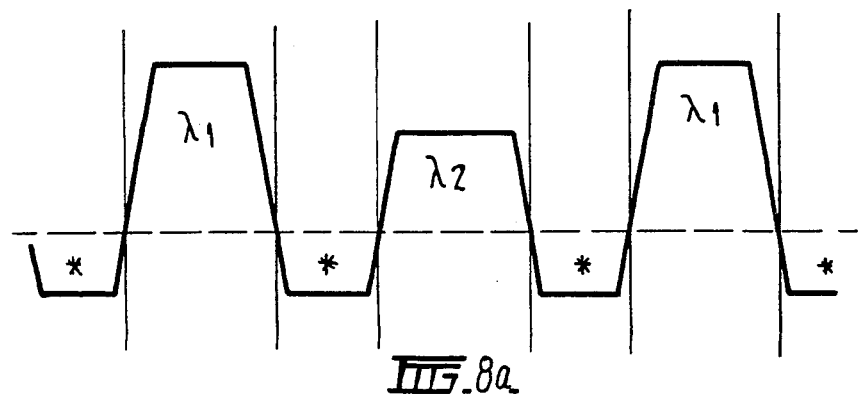
FIG. 8a, 8b and 8c are diagrams of certain signals developed within the circuit of FIG. 3.

The signal fed out of the amplifier 39 to the invertor 41 is typically as shown in FIG. 8a, except that a zero voltage level is not known, as the amplifiers therein are A.C. coupled and the zero information is lost. It is imperative that the exact height value of the $\lambda_1$ $\lambda_2$ signals be known and this be not just the measure of the height of the signals shown. In order to resolve this, the signal is rectified by inversion in the inverter 41. The respective portions of the signals are selected in response to the coding as appearing on lines TA, TB, TC and TD from the decoder 45 and as determined by the operation of the switch 43.

Figure 8B:
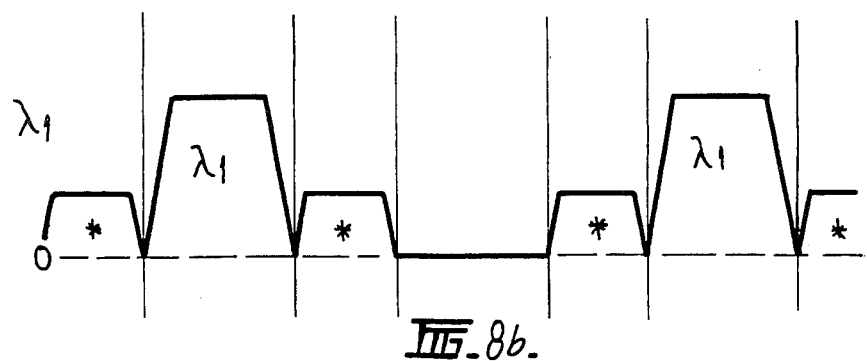
Figure 8C:
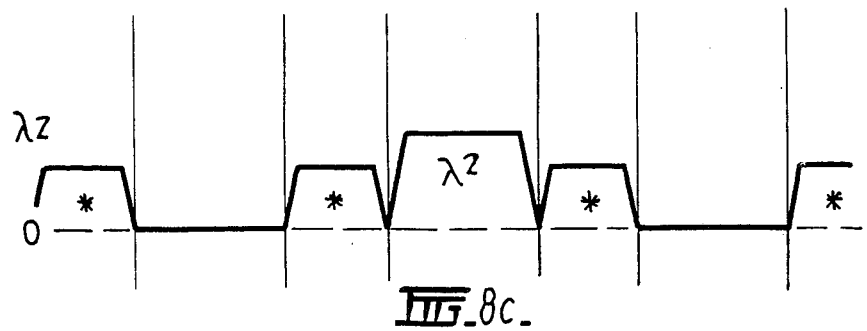

This in turn provides output signal $S_1$ for $\lambda_1$, as shown in FIG. 8b and output signal $S_2$ for $\lambda_2$, as shown in FIG. 8c. These signals are in turn passed through the respective channels of the filter 47 which provides the average of these signals, which in turn is representative of the corrected values of the $\lambda_1$, $\lambda_2$ signals emitted from the amplifier 39.

Returning now to the chopper wheel 3 as shown in FIG. 2 and to the decoder 45 shown in FIG. 6, one of the detectors 9 and a corresponding light source LED is aligned across the opaque areas 33, and the other detector 9 and LED is aligned across the other opaque areas 31. The detectors 9 are in angular alignment around the chopper wheel and arranged at 120° relative to the detector 5. Thus these detectors 9 and 5 are effectively in angular alignment with the pattern of the filters $\lambda_1$, $\lambda_2$. The detector 9 emits signals depending on whether they are subjected to receiving light from the respective LED's, and these signals are in turn decoded as shown by the Truth Table of FIG. 6 to activate the switch 43 and the inverter 41 in the manner described above.

As shown in the Appendix, heating rates of more than $3 \times 10^4$ K/S may be accommodated at 800 K with the present instrument, and this rate limit is proportional to $T^2$.

For large signal variations, as mentioned in the Appendix, the response rate of the pyrometer exceeds $3 \times 10^4$ K/s above about 800 K. Small-signal response is determined by the low-pass Bessel filters 25, which exist in order to eliminate ripple. A reduction in the response time of the pyrometer would be possible if the chopping frequency were increased, but an increase in the noise effective power of the detector would then have to be accepted.

A prototype of the pyrometer was tested by calibrating it against a standard black body source and providing the data necessary for a microcomputer to convert the output voltage $S_1/S_2$ to a temperature reading. It was found that noise was excessive ($>10\%$ of signal) below 600 K. The pyrometer was used successfully in a series of measurements in which bare or painted metal plates were irradiated by a CW laser at 10.6 μm incident power densities up to 300 MW/m². Some examples of these measurements are presented below.

Figure 9:
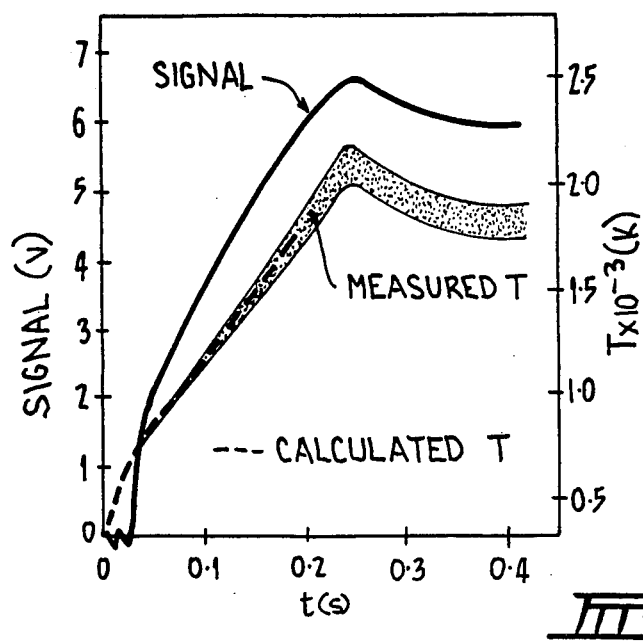
FIGS. 9 and 10 are graphs of test results using a prototype of the pyrometer.

FIG. 9 shows the signal-time trace and corresponding temperature-time variation when the pyrometer viewed the surface of a bare stainless steel 304 plate, 0.8 mm thick, at near-normal incidence. The temperature variation was based on $E_1/E_2=1.05\pm0.03$ and the result of this uncertainty in $E_1/E_2$ is indicated. After switch-on, the irradiation was constant at 130 MW/m² and uniform over an area of 8 mm × 8 mm. Since the viewed spot diameter was only 1 mm, and was in the center of the irradiated area, the heat transfer was effectively one-dimensional. A high-speed flow or argon prevented oxidation and removed most of the melt produced. In the absence of oxidation, the absorptance is almost constant. These conditions facilitate an approximate calculation of the temperature behavior up to melting, using an absorptance value (0.20) obtained by a separate simple measurement by using a much thinner plate with identical surface conditions. This was irradiated at a low measured intensity, so that the temperature difference between the front and rear surfaces was negligible. The absorptance was calculated from the temperature-time variation as measured by a rear-face thermocouple. As shown, the predicted behavior is matched by the measure. The temperature initially rises rapidly, then at a slower linear rate of 6670 K/s, until surface tension effects in the melt no longer resist the aerodynamic forces tending to remove the melt. The temperature peaks at 2100 K. When the removal process is established, a steady temperature of approximately 1820 K exists until burnthrough occurs.

The present pyrometer is particularly suitable for measurements on bare aluminum because the absolute value for the emissivity of aluminum is very sensitive to surface conditions, thereby making single-wavelength pyrometry inappropriate.

Figure 10:
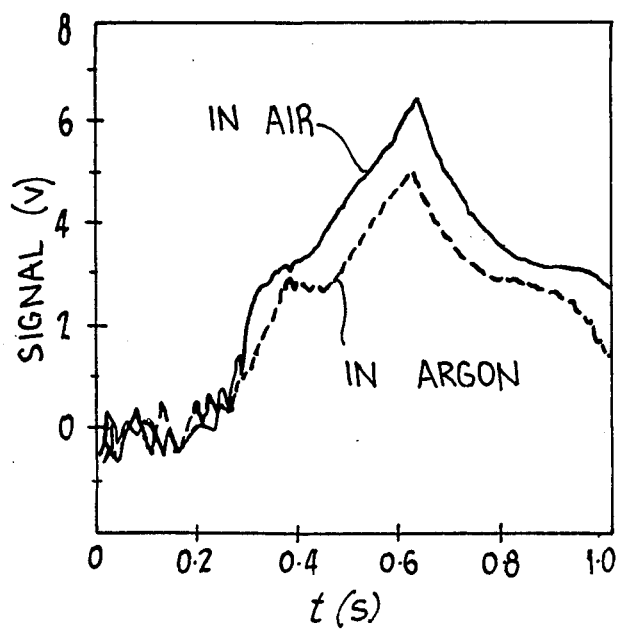

FIG. 10 shows two pyrometer signal-time traces, each for a bare aluminum 2024 alloy plate 0.4 mm thick, irradiated at 130 MW/M². One plate was in stagnant argon, the other in stagnant air. For the latter plate, oxidation during irradiation increased the surface absorptance, and thus the heating rate was faster than that for the plate in argon. Because melt was not removed in these examples, T continued to rise well above the melting temperature until the laser was switched off. The effect of latent heat on the heating and cooling rates is evident.

For such thin bare aluminum plates at incident intensities below 50 MW/M₂, simple calculations (see W. W. Duley, CO₂ Lasers: Effects & Applications) Academic, New York 1976 Chap 4.) show that the temperature difference between the front and rear surfaces is very small. In this case, temperature obtained with the pyrometer, assuming $E_1/E_2=1.17$, agree to within 3% with values provided by rear-face thermocouples.

APPENDIX

Response Of An AGC Loop To Rapid Temperature Changes

Let the amplifier output voltage which is intended to be held constant be $V_0$, and let the value to which it is to be held be $V_r$. Suppose that any difference between $V_o$ and $V_r$ is integrated with a time constant of $\tau$ seconds, and that the output $V_c$ of the integrator is used to control an AGC amplifier with a control characteristic of $K_a$ dB/V. Then $$(dV_c)/(dt) = -(V_o - V_r)/\tau \qquad (3)$$

where t is time. The amplifier gain can be written $$A_v = A_{vo}\exp[(K_a V_c \ln 10)/20] \qquad (4)$$

where $A_{vo}$ is some constant, so that $$(dA_v)/(dt) = (dA_v)/(dV_c)\cdot(dV_c)/(dt) = -A_v[K_a(-V_o-V_r)\ln10]/(20\tau) \qquad (5)$$

If V does not vary, the single-wavelength signal S (at the wavelength associated with $V_o$) will satisfy the relation $SA_v = K$ (where K is constant), i.e., $$(dS)/(dt) = -(S/A_v)(dA_v)/(dt) = S[K_a(-V_o-V_r)\ln10]/(20\tau) \qquad (6)$$

But from Eq. (1), $$(dS)/(dT) = (C_2 S)/(\lambda T^2) \qquad (7)$$

Thus from Eqs. [6] and [7]

$$\frac{dT}{dt} = \left[\frac{K_a V_r \ln 10}{20\tau}\right]\left[\frac{\lambda}{c_2}\right][T^2]\frac{V_o - V_r}{V_r} \qquad (8)$$

Equation (8) relates the rate of sample heating to the accuracy with which $V_o$ is held to its desired level $V_r$ by the AGC loop. The first term in the expression for $(dT)/(dt)$ is related to the AGC loop gain, and cannot be indefinitely increased without incurring instability. The instrument described in the present paper had a value of about 130 s$^{-1}$ for this term, and it is believed that this figure will be representative. The second term has a value of $1.7 \times 10^{-4}$ K$^{-1}$ at $\lambda = 2.5$ μm. Hence, for instruments similar to the present case, $$(dT)/(dt) = CT^2(V_o - V_r)/v_r \text{ where } C \approx 0.02 \text{ K}^{-1}\text{s}^{-1} \qquad (9)$$

Equation (9) predicts that only very slow heating rates can be accommodated by pyrometers using the constant-denominator principle. For example temperature rises faster than 130 K/s will produce errors of greater than 1% at 800 K. With a divider or ratio circuit, the only constraint is the need to avoid overload. The present instrument overloads when the output of the AGC stage overshoots by more than 1.3 V from a set level of 0.5 V; consequently it is able to accommodate heating rates of more than $3 \times 10^4$ K/s at 800 K (see Eq. (9)).

We claim:

1. An improved pyrometer which uses a I. R. radiation two wavelength measurement technique, said pyrometer having means for measuring the I. R. radiated from a surface of a body at two I. R. wavelengths and to provide first and second signals derived therefrom, electronic circuit means for maintaining the value of the second of said signals only approximately constant by a feedback control which monitors said second signal to ascertain a required feedback control, said circuit means also influencing the value of the first of said signals by substantially the same feedback control, and a means for determining a ratio between said first and second signals whereby to represent the temperature of said surface of said body.

2. A pyrometer as claimed in claim 1, wherein said means for measuring the I. R. radiated from said surface of said body is a single detector.

3. A pyrometer as claimed in claim 2, wherein said single detector is placed behind a rotatable chopper wheel so that I. R. radiated from the surface of said body and detected by said detector is interrupted by filter means on said chopper wheel upon rotation of said chopper wheel and wherein said filter means comprise a series of filter elements around the circumferential region of said chopper wheel, said filter elements being consecutively for one wavelength of I. R. and for the other wavelength of I. R.

4. A pyrometer as claimed in claim 3, wherein said chopper wheel also has a coded pattern of opaque areas, a light source and a detector means for said light source, said light source being mounted on one side of said chopper wheel and said detector means for said light source on the other side of said chopper wheel, so that said detector means for said light source receives a coded pattern of light thereon as said chopper wheel is rotated and generates coded signals therefrom, and comprising means for receiving the coded signals including switchable circuit means connected with said detector means for receiving said coded signals and for switching the signal values generated by the single detector for receiving the I. R. radiated from the surface of the body, whereby to separate the signal values into signals for one wavelength of I. R. and for the other wavelength of I. R.

5. A pyrometer as claimed in claim 4, wherein said coded pattern of opaque areas is in two radially separated bands, there being light source means and respective detector means for said light source means for each band, and wherein said means for receiving the coded signals comprises a decoder connecting with said switchable circuit means, said switchable circuit means having the signal values generated by the single detector for receiving the I. R. radiated from said surface of said body passed thereto as generated as determined by the coded signals, whereby to obtain full-wave rectified signal values representative of the magnitude of the signal values from zero, so that after filtering of these respective values of the magnitude of the signal values by respective low pass filter means, the resulting signal values will be the average signal values and representative of the I. R. received for the respective wavelengths.

6. A pyrometer as claimed in claim 4, wherein said coded pattern of opaque areas is in two radially separated bands, there being light source means and respective detector means for said light source means for each band, and wherein said means for receiving the coded signals comprises a decoder connecting with said switchable circuit means, said switchable circuit means having the signal values generated by the single detector for receiving the I. R. radiated from said surface of said body passed thereto as inverted by an inverter as determined by the coded signals, whereby to obtain full-wave rectified signal values representative of the magnitude of the signal values from zero, so that after filtering of these respective values of the magnitude of the signal values by respective low pass filter means, the resulting signal values will be the average signal values and representative of the I. R. received for the respective wavelengths.

* * * * *